(12) United States Patent
Werni

(10) Patent No.: US 8,319,453 B2
(45) Date of Patent: Nov. 27, 2012

(54) ELECTRONIC OPERATING DEVICE HAVING AN OUTPUT NETWORK FOR OPERATING AT LEAST ONE DISCHARGE LAMP

(75) Inventor: Horst Werni, Munich (DE)

(73) Assignee: Osram AG, Munich (DE)

( * ) Notice: Subject to any disclaimer, the term of this patent is extended or adjusted under 35 U.S.C. 154(b) by 184 days.

(21) Appl. No.: 12/679,014

(22) PCT Filed: Sep. 20, 2007

(86) PCT No.: PCT/EP2007/059938
§ 371 (c)(1),
(2), (4) Date: Mar. 19, 2010

(87) PCT Pub. No.: WO2009/039879
PCT Pub. Date: Apr. 2, 2009

(65) Prior Publication Data
US 2010/0308746 A1 Dec. 9, 2010

(51) Int. Cl.
| | |
|---|---|
| *G05F 1/00* | (2006.01) |
| *H05B 37/02* | (2006.01) |
| *H05B 39/04* | (2006.01) |
| *H05B 41/36* | (2006.01) |
| *H05B 37/00* | (2006.01) |
| *H05B 39/00* | (2006.01) |
| *H05B 39/02* | (2006.01) |
| *H05B 41/14* | (2006.01) |
| *H05B 41/16* | (2006.01) |
| *H05B 41/24* | (2006.01) |
| *H01J 11/04* | (2011.01) |
| *H01J 13/48* | (2006.01) |
| *H01J 15/04* | (2006.01) |
| *H01J 17/36* | (2006.01) |

(52) U.S. Cl. .............. 315/297; 315/200 R; 315/209 R; 315/246; 315/326

(58) Field of Classification Search .................. None
See application file for complete search history.

(56) References Cited

U.S. PATENT DOCUMENTS

| | | | | |
|---|---|---|---|---|
| 5,400,241 | A * | 3/1995 | Bergervoet | 363/132 |
| 5,410,221 | A * | 4/1995 | Mattas et al. | 315/307 |
| 5,740,021 | A | 4/1998 | Lecheler et al. | |
| 5,838,181 | A * | 11/1998 | Hesterman | 327/175 |
| 6,075,356 | A * | 6/2000 | Kovacs | 323/327 |
| 6,169,374 | B1 | 1/2001 | Chang | |
| 6,498,436 | B2 * | 12/2002 | Hartge et al. | 315/86 |

FOREIGN PATENT DOCUMENTS

| | | |
|---|---|---|
| DE | 4418886 A1 | 12/1995 |
| WO | 2006093216 A1 | 9/2006 |

OTHER PUBLICATIONS

International Search Report of PCT/EP2007/059938 mailed Jun. 25, 2008.

* cited by examiner

*Primary Examiner* — Douglas W Owens
*Assistant Examiner* — Dedei K Hammond

(57) ABSTRACT

An electronic operating device for operating at least one discharge lamp may include an output network having at least one input connection and at least one output connection, wherein the at least one input connection of the output network is coupled to one of a plurality of voltage rails, and wherein the at least one output connection of the output network is coupled to one of a plurality of poles of a supply voltage.

12 Claims, 1 Drawing Sheet

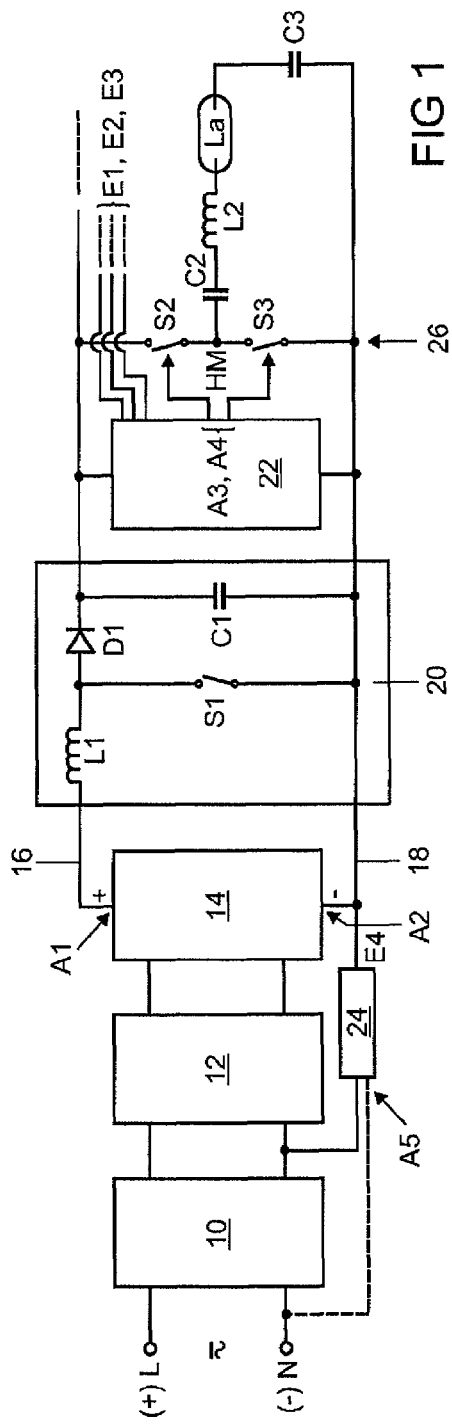
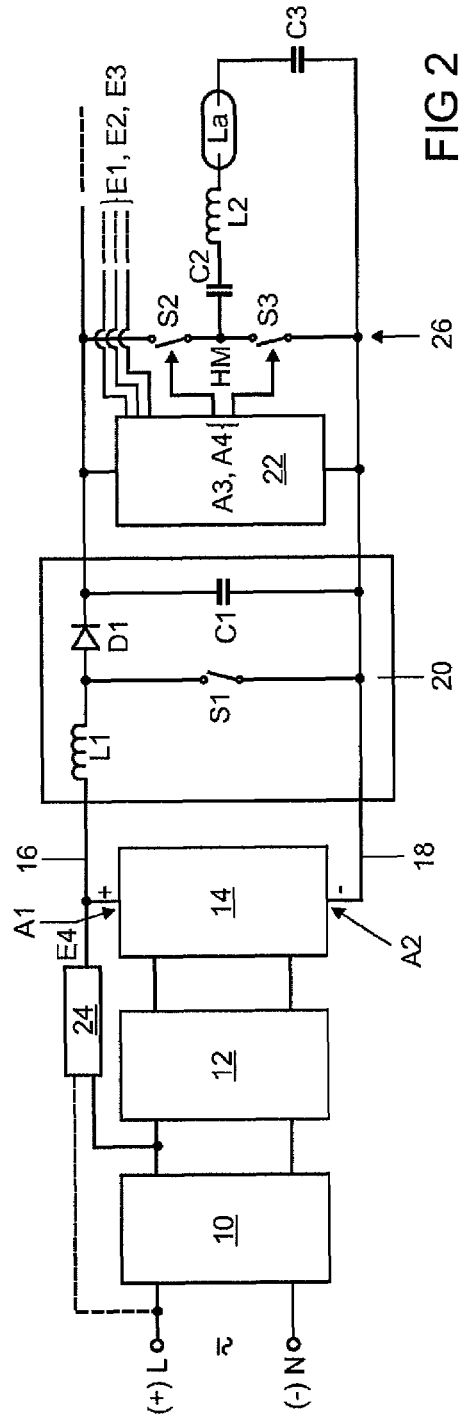

ELECTRONIC OPERATING DEVICE HAVING AN OUTPUT NETWORK FOR OPERATING AT LEAST ONE DISCHARGE LAMP

RELATED APPLICATIONS

The present application is a national stage entry according to 35 U.S.C. §371 of PCT application No.: PCT/EP2007/059938 filed on Sep. 20, 2007.

TECHNICAL FIELD

The present invention relates to an electronic operating device for operating at least one discharge lamp having a two-pole connection for connection of the electronic operating device to a supply voltage having a first pole and a second pole, a filter apparatus, which is coupled to the two-pole connection, for filtering EMC interference, a rectifier, which is coupled to the filter apparatus and has a first output connection and a second output connection, wherein the first output connection is coupled to a first voltage rail in order to provide a first reference potential, and the second output connection is coupled to a second voltage rail in order to provide a second reference potential, wherein the rectifier is configured to provide a DC voltage between its first output connection and its second output connection, an inverter having at least one first electronic switch and one second electronic switch, which is coupled between the first voltage rail and the second voltage rail, wherein the center point of the inverter is coupled to a connection for the at least one discharge lamp, and a monitoring and control apparatus, which is coupled between the first voltage rail and the second voltage rail and has at least one input connection which can be coupled to the at least one discharge lamp, in order to monitor at least one operating parameter of the at least one discharge lamp. An electronic operating device such as this is known, in which, by way of example, an Infineon IFX is used as a monitoring and control apparatus. In this case, various signals are monitored via a plurality of input connections of the IFX, for example the burning voltage, any possible asymmetry, the intermediate circuit voltage, the frequency and the like. The signals obtained via the input connections are linked and evaluated in the IFX, and can thus lead to operation of the discharge lamp being switched off. During actual operation, however, the signals which are applied to the input connections and the supply of the IFX have interference superimposed on them. On the one hand, this can interfere with reliable monitoring, while on the other hand unauthorized switching off may occur.

The supply voltage which is applied to the two-pole connection may be an AC voltage, but may also be a DC voltage supply, particularly for emergency operation.

BACKGROUND

In the prior art, such high-sensitivity monitoring and control apparatuses are either accommodated in a metal housing, which involves increased costs and which is worth using only when a protective-ground connection is available. Alternatively, the switching-off threshold is chosen to be relatively high, although this means that the electronic operating device may fail if the lamp burning voltage rises severely, or must be overdesigned appropriately for this case.

Summary

Various embodiments develop an electronic operating device as mentioned initially in order in this way to make it possible to ensure operation without using a metal housing, that is to say with an electronic operating device such as this being accommodated in a plastic housing without a protective-ground connection, while reliably monitoring a connected discharge lamp.

This object is achieved by an electronic operating device having a two-pole connection for connection of the electronic operating device to a supply voltage having a first pole and a second pole; a filter apparatus, which is coupled to the two-pole connection, for filtering EMC interference; a rectifier, which is coupled to the filter apparatus and has a first output connection and a second output connection, wherein the first output connection is coupled to a first voltage rail in order to provide a first reference potential, and the second output connection is coupled to a second voltage rail in order to provide a second reference potential, wherein the rectifier is configured to provide a DC voltage between its first output connection and its second output connection; an inverter having at least one first electronic switch and one second electronic switch, which is coupled between the first voltage rail and the second voltage rail, wherein the center point of the inverter is coupled to a connection for the at least one discharge lamp; and a monitoring and control apparatus, which is coupled between the first voltage rail and the second voltage rail and has at least one input connection which can be coupled to the at least one discharge lamp, in order to monitor at least one operating parameter of the at least one discharge lamp; wherein the electronic operating device furthermore has an output network having at least one input connection and at least one output connection, wherein the at least one input connection of the output network is coupled to one of the voltage rails, and wherein the at least one output connection of the output network is coupled to one of the poles.

Various embodiments are based on the knowledge that a large proportion of the interference which is superimposed on the signals which are applied to the input connections of the monitoring and control apparatus originates from the electronic switches which are provided in an electronic operating device, for example the inverter switch. This interference is not only superimposed on the signals which are applied to the input connections but also influences the supply to the monitoring and control apparatus. Since a two-pole connection for connection to a supply voltage has no protective round various embodiments provide an output network having at least one input connection and at least one output connection, wherein the at least one input connection of the output network is coupled to one of the voltage rails, and wherein the at least one output connection of the output network is coupled to one of the soles. This reliably dissipates radio-frequency interference which occurs at the supply connections of the monitoring and control apparatus wherein, if the input connection of the output network is connected to the first reference potential which preferably represents the positive potential the output connection of the output connection is coupled to the line connection while when the input connection of the output network is coupled to the second reference potential, that is to say in particular the negative potential, the output of the output network is coupled to the neutral connection.

Undesirable switching off during normal operation (AC operation) or during emergency operation (DC operation) can thus be reliably prevented even without a protective ground being connected. Furthermore, this also makes it possible to design the switching-off process such that the electronic operating device does not fail when the burning voltage of the discharge lamp rises sharply. As is evident from this, the first pole may represent a line connection, and the second pole may represent a neutral connection. Alternatively, in particular during emergency operation, the first pole may represent a positive connection and the second pole may represent a negative connection.

It is particularly preferable that the present invention allows the construction of protection class II lights, that is to say lights without a metal housing and without a protective-ground connection. The output network preferably has at least one capacitor, which is coupled in series between the at least one input connection of the output coupling network and the at least one output connection of the output network. This results in a particularly simple but nevertheless reliable implementation of an electronic operating device according to the invention. In this case, the capacitor preferably has a capacitance between 1 pF and 1 nF, in particular between 10 pF and 100 pF.

As already mentioned, according to one preferred embodiment, an electronic operating device according to the invention is integrated in a protection class II light. The requirements applicable to protection class II lights are less stringent than those for protection class I lights and allow a lower-cost implementation and lower-cost maintenance. With regard to the last item, it should be noted that, in the case of protection class II lights, the end user—in contrast to the situation with protection class I lights—need not have any annual costly checking of the protective conductive connection carried out.

The coupling of the at least one output connection of the output network to one of the poles is preferably located on that side of the filter apparatus which is opposite the two-pole connection.

In one preferred embodiment, the filter apparatus includes a first partial filter apparatus and a second partial filter apparatus which are coupled in series between the two-pole connection and the rectifier, wherein the coupling of the at least one output connection of the output network to one of the poles is located between the first partial filter apparatus and the second partial filter apparatus. This measure allows two-stage EMC filter apparatuses to be combined in a simple manner with the fundamental idea on which the present invention is based.

The output network is preferably coupled between one of the voltage rails and one of the poles such that the output network bridges at least one inductance.

Finally, it is preferable for the monitoring and control apparatus to be in the form of an integrated circuit, in particular an ASIC.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1: shows a schematic illustration of a first embodiment of an electronic operating device according to the invention; and FIG. 2 shows a schematic illustration of a second embodiment of an electronic operating device according to the invention.

DETAILED DESCRIPTION

The following detailed description refers to the accompanying drawings that show, by way of illustration, specific details and embodiments in which the invention may be practiced.

FIG. 1 shows a schematic illustration of the design of a first exemplary embodiment of an electronic operating device according to the invention. On the input side, this has two poles L, N, with pole L representing a line connection, and the pole N representing a neutral connection. This is followed by a first partial filter apparatus 10 to which a second partial filter apparatus 12 is connected. The first partial filter apparatus 10 is optional, in particular with switching groups which have uncompensated inductors and capacitors being combined in it. In particular, the second partial filter apparatus 12 has switching groups with parallel-arranged capacitors, so-called parallel-C, and current-compensated inductors. The output of the partial filter apparatus 12 is coupled to the input of a rectifier 14, whose outputs A1, A2 are coupled to a first voltage rail 16 and a second voltage rail 18, between which a DC voltage is provided. Furthermore, in the exemplary embodiment shown in FIG. 1, an optional voltage converter 20 is shown, which includes an inductance L1, a switch S1, a diode D1 and a capacitor C1. In the present case, the voltage converter is in the form of a step-up converter. Without adversely affecting the invention, it may also be in the form of a step-down converter, a Buck converter or the like.

In order to supply, a monitoring and control apparatus 22 is coupled between the first voltage rail 16 and the second voltage rail 18, and has three inputs E1 to E3 in order to monitor a plurality of operating parameters of a discharge lamp La. It also has two outputs A3, A4, in order to operate the two switches S2, S3 in a half-bridge circuit of an inverter 26. The half-bridge center point HM is coupled via the series circuit of a capacitor C2 and a lamp inductor L2 to the discharge lamp La. Furthermore, a coupling capacitor C3 is provided. As is obvious to a person skilled in the art, the discharge lamp La may also be connected in some other way without precluding the use of the present invention.

According to the invention, in the exemplary embodiment shown in FIG. 1, the voltage rail 18 is coupled to the neutral connection via an output network 24, which has an input E4 and an output A5. The coupling can be made before the first partial filter apparatus 10 or between the two partial filter apparatuses 10 and 12.

The output network particularly preferably has a capacitor which is not illustrated but is coupled in series between the input connection E4 of the output network 24 and the output connection A5 of the output network 24.

FIG. 2 shows a further exemplary embodiment of an electronic operating device according to the invention, in which components which correspond to those in FIG. 1 are identified by the same reference symbols, and only the differences from FIG. 1 will be described in the following text. In the embodiment shown in FIG. 2, the input E4 of the output network 24 is connected to the first voltage rail 16, while the output A5 is coupled to the line connection, to be precise either before the first filter apparatus 10 or between the first filter apparatus 10 and the second filter apparatus 12.

According to one embodiment, which is not illustrated, the output A5 of the output network 24 is coupled to both the coupling points that are shown.

The input voltage which is present between the line connection and the neutral connection may be both an AC voltage and DC voltage. If it is a DC voltage, the rectifier 14 then provides polarity-reversal protection.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An electronic operating device for operating at least one discharge lamp, the electronic operating device comprising:
   a two-pole connection for connection of the electronic operating device to a supply voltage having a first pole and a second pole;
   a filter apparatus, which is coupled to the two-pole connection, for filtering EMC interference;
   a rectifier, which is coupled to the filter apparatus and has a first output connection and a second output connection, wherein the first output connection is coupled to a first voltage rail in order to provide a first reference potential, and the second output connection is coupled to a second voltage rail in order to provide a second reference potential,
   wherein the rectifier is configured to provide a DC voltage between its first output connection and its second output connection;
   an inverter having at least one first electronic switch and one second electronic switch, which is coupled between the first voltage rail and the second voltage rail, wherein the center point of the inverter is coupled to a connection for the at least one discharge lamp; and
   a monitoring and control apparatus, which is coupled between the first voltage rail and the second voltage rail and has at least one input connection which can be coupled to the at least one discharge lamp, in order to monitor at least one operating parameter of the at least one discharge lamp;
   wherein the electronic operating device furthermore has an output network having at least one input connection and at least one output connection, wherein the at least one input connection of the output network is coupled to one of the voltage rails, and wherein the at least one output connection of the output network is coupled to one of the poles prior to the coupling of the poles to the filter apparatus.

2. The electronic operating device as claimed in claim 1, wherein the first pole represents a line connection, and the second pole represents a neutral connection.

3. The electronic operating device as claimed in claim 1, wherein the first pole represents a positive connection, and the second pole represents a negative connection.

4. The electronic operating device as claimed claim 1, wherein the output network has at least one capacitor, which is coupled in series between the at least one input connection of the output network and the at least one output connection of the output network.

5. The electronic operating device as claimed in claim 4, wherein the capacitor has a capacitance in the range from 1 pF to 1 nF.

6. The electronic operating device as claimed in claim 1, wherein the electronic operating device is integrated in a protection class II light.

7. The electronic operating device as claimed in claim 1, wherein the coupling of the at least one output connection of the output network to one of the poles is located on that side of the filter apparatus which is opposite the two-pole connection.

8. The electronic operating device as claimed in claim 1, wherein the filter apparatus comprises a first partial filter apparatus and a second partial filter apparatus which are coupled in series between the two-pole connection and the rectifier, wherein the coupling of the at least one output connection of the output network to one of the poles is located between the first partial filter apparatus and the second partial filter apparatus.

9. The electronic operating device as claimed in claim 1, wherein the output network is coupled between one of the voltage rails and one of the poles such that the output network bridges at least one inductance.

10. The electronic operating device as claimed in claim 1, wherein the monitoring and control apparatus is in the form of an integrated circuit.

11. The electronic operating device as claimed in claim 5, wherein the capacitor has a capacitance in the range from 10 pF to 100 pF.

12. The electronic operating device as claimed in claim 10, wherein the monitoring and control apparatus is in the form of an ASIC.

* * * * *